(12) United States Patent
Ishizaki et al.

(10) Patent No.: US 12,036,923 B2
(45) Date of Patent: Jul. 16, 2024

(54) INDUSTRIAL VEHICLE

(71) Applicant: KABUSHIKI KAISHA TOYOTA JIDOSHOKKI, Kariya (JP)

(72) Inventors: Masataka Ishizaki, Aichi-ken (JP); Hiroyuki Ito, Aichi-ken (JP); Takahito Miyake, Aichi-ken (JP); Keishi Ashida, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/674,408

(22) Filed: Feb. 17, 2022

(65) Prior Publication Data
US 2022/0274525 A1    Sep. 1, 2022

(30) Foreign Application Priority Data

Feb. 26, 2021  (JP) .................................. 2021-029374

(51) Int. Cl.
*B60Q 9/00* (2006.01)
*B60Q 1/50* (2006.01)
*B66F 17/00* (2006.01)
*G08G 1/16* (2006.01)

(52) U.S. Cl.
CPC ............ *B60Q 9/008* (2013.01); *B60Q 1/525* (2013.01); *B66F 17/003* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 11,544,937 B2* | 1/2023 | Minami | G06V 20/58 |
| 2004/0148057 A1* | 7/2004 | Breed | G02B 13/008 |
| | | | 700/242 |
| 2006/0006988 A1* | 1/2006 | Harter, Jr. | B60Q 9/008 |
| | | | 348/148 |
| 2012/0025964 A1* | 2/2012 | Beggs | G08G 1/166 |
| | | | 340/435 |
| 2015/0138002 A1* | 5/2015 | Beggs | B66F 17/003 |
| | | | 340/944 |

(Continued)

FOREIGN PATENT DOCUMENTS

| | | |
|---|---|---|
| EP | 3 716 145 A1 | 9/2020 |
| JP | 2011-195334 A | 10/2011 |

(Continued)

OTHER PUBLICATIONS

Hearing Notice issued Apr. 12, 2024 in Indian Application No. 202244006603.

(Continued)

*Primary Examiner* — Muhammad Adnan
(74) *Attorney, Agent, or Firm* — Sughrue Mion, PLLC

(57) ABSTRACT

An industrial vehicle includes a vehicle body, a driver compartment provided in the vehicle body, an obstacle detector configured to detect an obstacle existing behind the vehicle body, a warning generator configured to generate a warning, and a control device configured to control the warning generator. The warning generator is positioned at least in front of the driver compartment. The control device actuates the warning generator when the obstacle detector detects an obstacle behind the vehicle body that is moving rearward.

9 Claims, 5 Drawing Sheets

(56) References Cited

U.S. PATENT DOCUMENTS

| | | | | |
|---|---|---|---|---|
| 2015/0170493 A1* | 6/2015 | Beggs | ............... | B66F 17/003 |
| | | | | 340/539.11 |
| 2016/0023600 A1* | 1/2016 | Okamoto | ............ | B60Q 9/00 |
| | | | | 340/435 |
| 2016/0052762 A1 | 2/2016 | Swift | | |
| 2016/0378104 A1* | 12/2016 | Hiei | ..................... | B60Q 9/00 |
| | | | | 701/2 |
| 2017/0178512 A1* | 6/2017 | Kannon | ............. | B60Q 9/008 |
| 2017/0337820 A1* | 11/2017 | Glatfelter | ............ | G08G 1/166 |
| 2018/0170250 A1* | 6/2018 | Hänninen | ........... | G08G 1/163 |
| 2018/0268701 A1* | 9/2018 | Sato | ................ | G02B 27/0101 |
| 2020/0311964 A1* | 10/2020 | Ishizaki | ............... | G06T 7/50 |
| 2020/0327341 A1* | 10/2020 | Minami | .............. | E02F 9/261 |

FOREIGN PATENT DOCUMENTS

| | | | |
|---|---|---|---|
| JP | 2020-90381 A | | 6/2020 |
| KR | 10-2012-0084868 A | | 7/2012 |
| KR | 20120084868 A | * | 7/2012 |
| KR | 10-2020-0013544 A | | 2/2020 |
| KR | 20150000317 U | * | 6/2020 |

OTHER PUBLICATIONS

Communication issued Apr. 22, 2024 in European Application No. 22 157 717.4.

* cited by examiner

INDUSTRIAL VEHICLE

CROSS-REFERENCE TO RELATED APPLICATION

This application claims priority to Japanese Patent Application No. 2021-029374 filed on Feb. 26, 2021, the entire disclosure of which is incorporated herein by reference.

BACKGROUND ART

The present disclosure relates to an industrial vehicle, particularly relates to an industrial vehicle provided with an obstacle detector configured to detect an obstacle and an obstacle alarm configured to give an alarm about detection of the obstacle.

Japanese Patent Application Publication No. 2011-195334 discloses a safety device of a forklift truck which has been known as a conventional technique of an industrial vehicle. This safety device of the forklift truck includes a lift bracket attached to a fork fixing bracket, and a contactless measuring device capable of measuring an obstacle in front of a lower end part of the lift bracket between forks with the lift bracket protruding downward. The safety device of the forklift truck further includes a project-retract mechanism for projecting or retracting the lift bracket. The project-retract mechanism allows the lift bracket to protrude downward from the fork fixing bracket by a predetermined length when the forks move upward, and allows the contactless measuring device to retract not to contact a floor when the forks move downward. A notifier is disposed at a position where the notifier can be seen from a driver seat. The notifier is configured to notify an operator of presence of an obstacle in front of the forklift truck, the obstacle being measured by the contactless measuring device.

For example, when a forklift truck as an industrial vehicle unloads a cargo mounted on forks to a relatively high position such as a rack, an operator operates the forklift truck so as to avoid interference between the forks or the cargo and the rack. The operator may operate the forklift truck to repeatedly move back and forth relative to the rack in order to determine an unloading position of the cargo. In this case, when the operator operates the forklift truck to move rearward with the cargo mounted on the forks, the operator cannot check behind the forklift truck because the operator who is looking at the cargo and the forks faces a front direction of the forklift truck in order to avoid interference between the forks or the cargo and the rack. That is, there is a problem that the operator cannot check behind the forklift truck when the forklift truck moves rearward.

The safety device of the forklift truck disclosed in Japanese Patent Application Publication No. 2011-195334 simply notifies the operator of presence of an obstacle in front of the forklift truck, the obstacle being measured by the contactless measuring device.

The present disclosure, which has been made in light of the above-mentioned problem, is directed to providing an industrial vehicle configured to notify an operator of presence of an obstacle behind a vehicle body in accordance with detection of the obstacle behind the vehicle body even when the operator facing a front direction of the vehicle body operates the vehicle body to move rearward.

SUMMARY

An industrial vehicle includes a vehicle body, a driver compartment provided in the vehicle body, an obstacle detector configured to detect an obstacle existing behind the vehicle body, a warning generator configured to generate a warning, and a control device configured to control the warning generator. The warning generator is positioned at least in front of the driver compartment. The control device actuates the warning generator when the obstacle detector detects an obstacle behind the vehicle body that is moving rearward.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

First Embodiment

The following will describe an industrial vehicle according to an embodiment of the present disclosure with reference to the accompanying drawings. The industrial vehicle of the present embodiment corresponds to a forklift truck. It is noted that terms of "front/rear", "right/left", "up/down" indicating directions are determined based on a state in which an operator operating a forklift truck sits on a driver seat of a driver compartment and faces a forwarding direction of the forklift truck.

Figure 1:
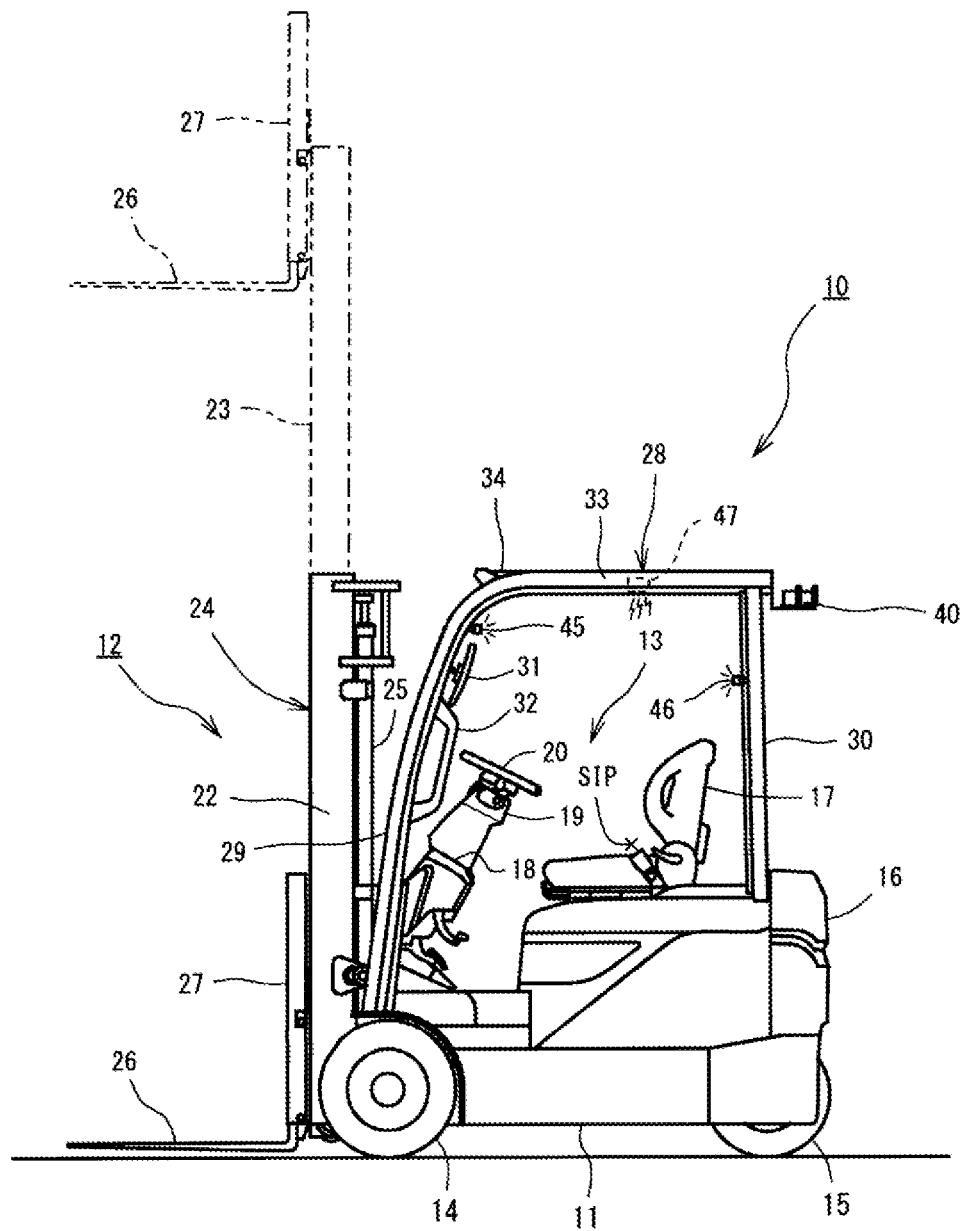
FIG. 1 is a side view of a forklift truck according to a first embodiment.

As illustrated in FIG. 1, a forklift truck 10 has a cargo handling system 12 on a front part of a vehicle body 11. The forklift truck 10 has a driver compartment 13 that is provided near a center of the vehicle body 11. The forklift truck 10 has driving wheels 14 serving as front wheels that are provided in a front part of the vehicle body 11. A steered wheel 15 serving as a rear wheel is provided on a rear part of the vehicle body 11. A counterweight 16 is provided on the rear part of the vehicle body 11. The counterweight 16 adjusts a vehicle weight and balances weight of the vehicle body 11. The forklift truck 10 of the present embodiment is a battery-powered forklift truck having the steered wheel 15 that is a single wheel.

The driver compartment 13 of the vehicle body 11 has a driver seat 17. The driver seat 17 is a seat on which the operator operating the forklift truck 10 sits. The driver seat 17 is positioned on the left with respect to the center of the vehicle body 11 in its vehicle width direction (in a right-left direction), and is turnable rightward to a specific angle along a horizontal direction. The driver seat 17 is positioned on the left with respect to the center of the vehicle body 11 in its vehicle width direction and turns right to the specific angle, which allows the operator to visually check behind the vehicle body 11 when the forklift truck 10 moves rearward.

Figure 2:
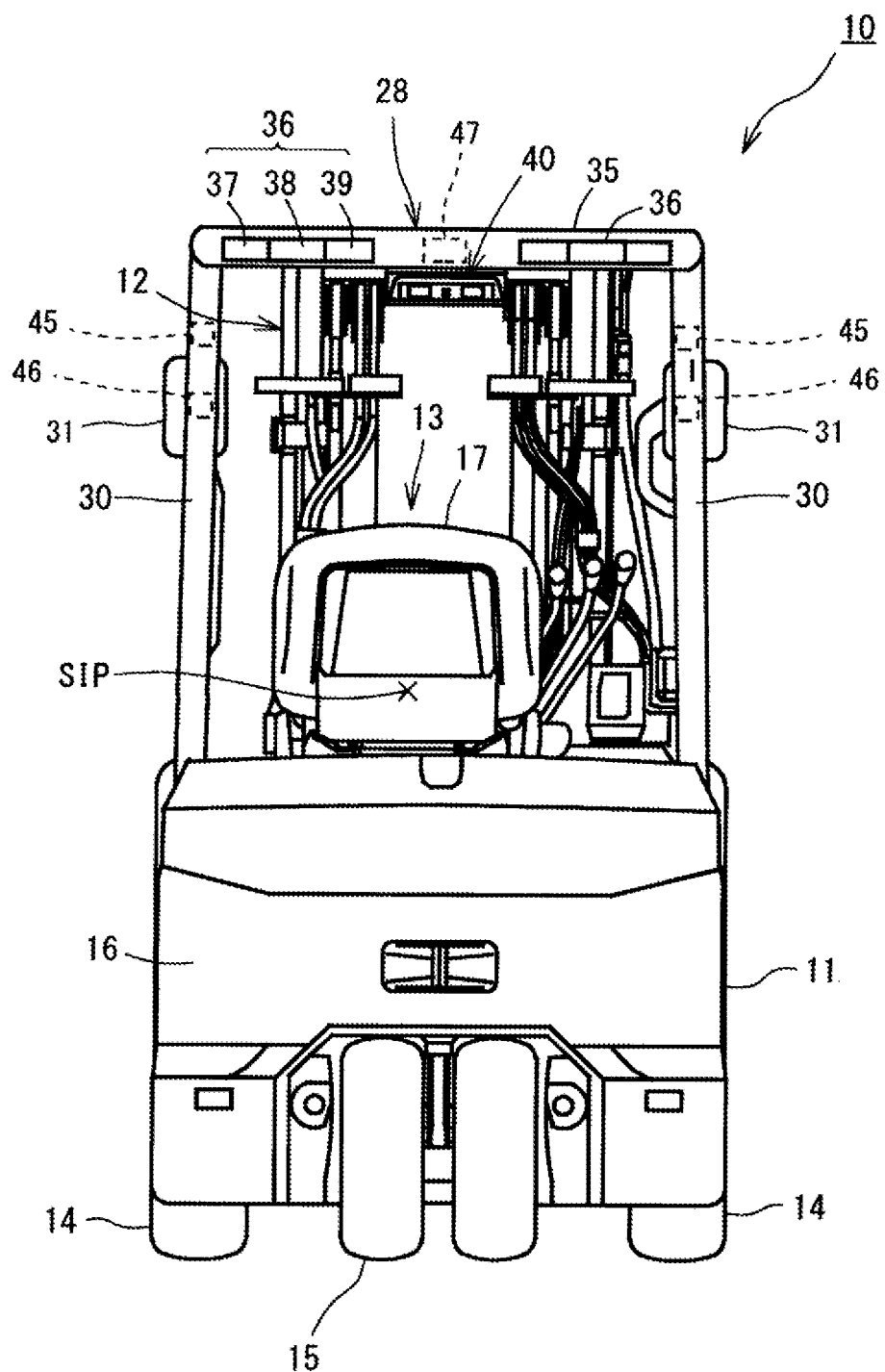
FIG. 2 is a rear view of the forklift truck according to the first embodiment.

As illustrated in FIG. 1 and FIG. 2, a Seat Index Point (SIP) is defined in the driver seat 17 of the forklift truck 10 of the present embodiment. The SIP is set forth by ISO (ISO 5353), JIS (JIS A 8318), or the like, and refers to a seat index point defined in the vicinity of theoretical joints between driver's torso and thighs. As illustrated in FIG. 2, since the driver seat 17 of the present embodiment is positioned on the left with respect to the center of the vehicle body 11 in its vehicle width direction, the SIP is positioned on the left side with respect to the center of the vehicle body 11 in its vehicle width direction.

An instrument panel 18 is disposed in front of the driver seat 17. The instrument panel 18 has a steering column 19. A steering wheel 20 is attached to the steering column 19.

The cargo handling system 12 has a mast 24 having a pair of right and left outer masts 22 and an inner mast 23. The inner mast 23 is slidable between the pair of right and left outer masts 22. A tilt cylinder (not illustrated) that is hydraulically actuated is disposed between the vehicle body 11 and the outer masts 22. Actuation of the tilt cylinder allows the mast 24 to tilt along a front-rear direction with a lower end of the mast 24 as a fulcrum. The mast 24 is provided with a lift cylinder 25 that is hydraulically actuated. Actuation of the lift cylinder 25 allows the inner mast 23 to slide up and down between the pair of right and left outer masts 22.

A pair of right and left forks 26 is attached to the mast 24 with a lift bracket 27 that is provided movably up and down relative to the inner mast 23. That is, the lift bracket 27 is movable up and down relative to the mast 24. The pair of right and left forks 26 have the same configuration.

The vehicle body 11 has a head guard 28 that covers an upper part of the driver compartment 13. The head guard 28 is supported by a pair of right and left front pillars 29 extending upward from a front part of the vehicle body 11 and a pair of right and left rear pillars 30 extending upward from a rear part of the vehicle body 11. The pair of right and left front pillars 29 has side mirrors 31 one by one. The left front pillar 29 is provided with a grip 32 for the operator to easily get on and off the forklift truck 10. The grip 32 is disposed at a substantially intermediate portion of the left front pillar 29 in a vertical direction, and the side mirrors 31 are positioned higher than the grip 32. The front pillars 29 are positioned forward of the driver compartment 13, and the rear pillars 30 are positioned rearward of the driver compartment 13.

A known head guard is adapted to the head guard 28. The head guard 28 has a pair of right and left side beams 33 respectively formed integrated with the front pillars 29 with a hollow structural member, a roof 34 that has a grid pattern and is provided between the pair of right and left side beams 33, and a rear beam 35 that connects rear ends of the pair of right and left side beams 33. As illustrated in FIG. 2, a pair of right and left rear combination lamps 36 is provided on a rear end surface of the rear beam 35. Each of the rear combination lamps 36 is a lamp in which a directional indicator 37, a brake lamp 38, and a reversing lamp 39 are integrally combined together.

The forklift truck 10 of the present embodiment includes a camera unit 40 serving as an obstacle detector configured to detect an obstacle behind the forklift truck 10. The camera unit 40 has a stereo camera having a pair of right and left camera lenses. A laser rangefinder (not illustrated) is built in the stereo camera of the present embodiment. The laser rangefinder measures a distance within a range where the stereo camera can capture an image by using a laser light. The camera unit 40 is attached to the rear beam 35 such that the pair of right and left lenses of the camera unit 40 faces the rear direction of the vehicle body 11. The camera unit 40 captures the image behind the vehicle body 11 when the forklift truck 10 moves rearward. The camera unit 40 may capture the image of the rear direction of the vehicle body 11 when the forklift truck 10 stops or moves forward.

Figure 3A:
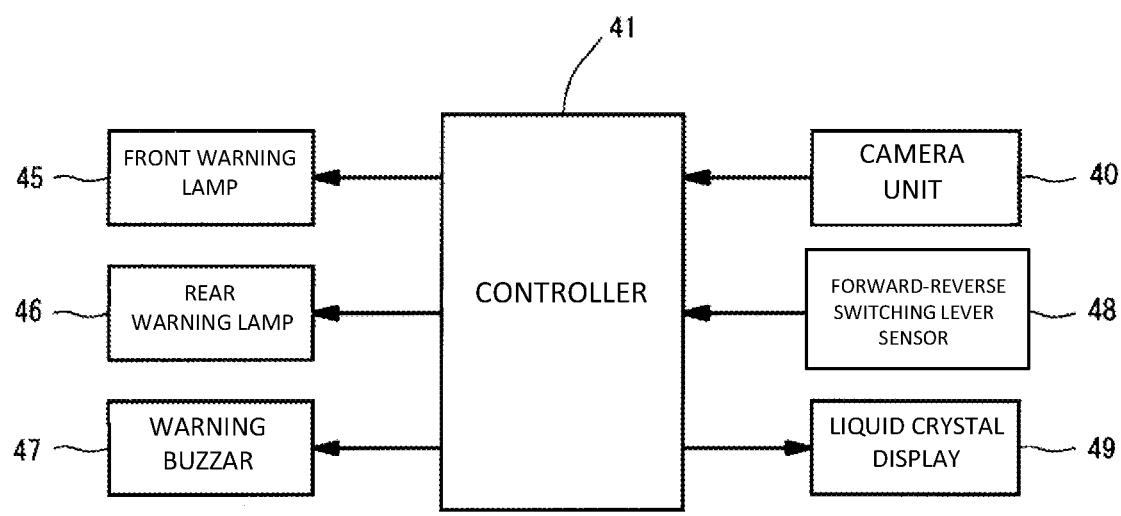
FIG. 3A is a block diagram illustrating a schematic configuration of the forklift truck.

As illustrated in FIG. 3A, the vehicle body 11 is equipped with a controller 41 serving as a control device configured to control components of the forklift truck 10. The controller 41 is connected to the camera unit 40 and analyzes the images captured by the camera unit 40. Presence or absence of an obstacle in such a captured image and a distance to the obstacle are detected based on a result of image analysis of the captured image. When an obstacle is detected by the image analysis of the controller 41, the controller 41 recognizes presence of the obstacle behind the vehicle body 11. The controller 41 has a central processing unit (CPU), a storage unit, and the like which are not illustrated. The central processing unit executes various programs and performs processes required for operating the forklift truck 10. The storage unit stores various programs and various kinds of data.

The forklift truck 10 of the present embodiment includes warning lamps each serving as a warning generator configured to generate a warning when the obstacle is detected in the captured image captured by the camera unit 40 with the forklift truck 10 moving rearward. The warning lamps correspond to a pair of front warning lamps 45 attached to the pair of right and left front pillars 29 respectively, and a pair of rear warning lamps 46 attached to the pair of right and left rear pillars 30 respectively.

The front warning lamps 45 each have an orange light emitting part (not illustrated). The light emitting part of each of the front warning lamps 45 intermittently lights up (blinks). Each of the front warning lamps 45 is attached to a rear part of the corresponding front pillar 29 such that the operator sitting on the driver seat 17 easily sees and checks the light emitting part. Positions of the front warning lamps 45 in the vertical direction are set higher than middle parts of the front pillars 29 in the vertical direction, and are set higher than the side mirrors 31 respectively attached to the front pillars 29. The front warning lamps 45 need not be attached directly to the front pillars 29. For example, the front warning lamps 45 may be attached to the side mirrors 31 attached to the pair of right and left front pillars 29, respectively. Alternatively, the front warning lamps 45 may be embedded onto mirror surfaces of the side mirrors 31.

The front warning lamps 45 are simply required to exist within a visible area of the operator seated on the driver seat 17, the operator facing the front direction of the forklift truck 10. The visible area in the vertical direction of the operator facing the front direction of the forklift truck 10 covers a range where the operator can see the forks 26 lifted upward from a road surface in front of the forklift truck 10 to the highest position. The visible area of the operator in the right-left direction covers at least a range where the operator can see while facing the front direction of the forklift truck 10. The front warning lamps 45 are simply required to be positioned at least above the SIP in the vertical direction and in front of the driver seat 17. Considering the visible area of the operator when the operator gazes at the forks 26 as the highest position, the front warning lamps 45 may be positioned at the same height as the head guard 28. For example, the front warning lamps 45 may be disposed in a front part of the roof 34.

The rear warning lamps 46 each have the same structure as the front warning lamps 45 and each have an orange light emitting part (not illustrated). Each of the rear warning lamps 46 is attached to a front part of the corresponding rear pillar 30 such that the light emitting part is easily seen and checked by the operator while sitting on the driver seat 17 and looking back. Since the operator who is looking back is not likely to look upward, the rear warning lamps 46 are positioned lower than the front warning lamps 45 in the vertical direction. In the present embodiment, the rear warning lamps 46 are positioned at the same height as attachment positions of the side mirrors 31. The rear warning lamps 46 may be attached to any positions between lower ends of the rear pillars 30 and the same height as the attachment positions of the side mirrors 31. Since the operator often looks at a rear right direction of the forklift truck 10 that is moving rearward, at least one of the rear warning lamps 46 is preferably attached to at least the right rear pillar 30.

The forklift truck 10 includes the front warning lamps 45 and the rear warning lamps 46 serving as first warning generators, and the forklift truck 10 includes a warning buzzer 47 serving as a second warning generator. The warning buzzer 47 emits warning sound when the obstacle is detected in the captured image captured by the camera unit 40 with the forklift truck 10 moving rearward. The warning buzzer 47 is attached to the head guard 28, specifically a backside surface of the roof 34 of the head guard 28 such that a sounding surface of the warning buzzer 47 is oriented to the driver seat 17 positioned below the warning buzzer 47. Positions and members for attaching the warning buzzer 47 are not limited to the head guard 28 as long as the operator sitting on the driver seat 17 can hear the warning sound. The sounding surface of the warning buzzer 47 is oriented to the driver seat 17 positioned below the warning buzzer 47, which allows the operator to easily hear the warning sound and prevents rainwater from entering the sounding surface.

As illustrated in FIG. 4, the front warning lamps 45, the rear warning lamps 46, and the warning buzzer 47 are connected to the controller 41, and are controlled by the controller 41. Therefore, when the obstacle is detected by the image analysis of the controller 41, the controller 41 blinks the front warning lamps 45 and the rear warning lamps 46 at the same time, and causes the warning buzzer 47 to emit the warning sound. The forklift truck 10 includes a forward-reverse switching lever (not illustrated) that switches between back and forth movements of the forklift truck 10, and a forward-reverse switching lever sensor 48 that outputs a signal indicative of a switching position of the forward-reverse switching lever. The forward-reverse switching lever sensor 48 is connected to the controller 41. The controller 41 determines whether the forklift truck 10 moves forward, moves rearward, or stops based on the signal outputted from the forward-reverse switching lever sensor 48. The front warning lamps 45, the rear warning lamps 46, and the warning buzzer 47 are actuated when the forward-reverse switching lever is at a reverse position, and are not actuated when the forward-reverse switching lever is at a forward position or a neutral position.

Figure 3B:
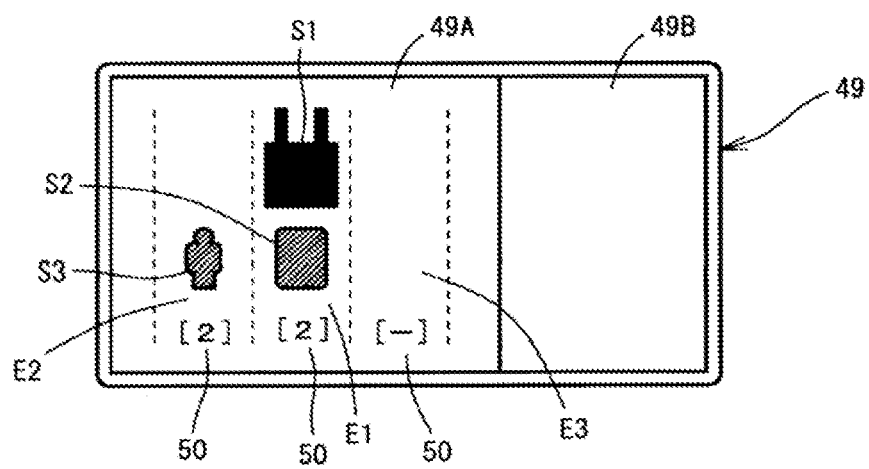
FIG. 3B is a diagram illustrating a displaying example of a liquid crystal display.

As illustrated in FIG. 3A, the controller 41 is connected to a liquid crystal display 49 serving as a display device. The liquid crystal display 49 is provided on a left side of the steering column 19 on the instrument panel 18, which is not illustrated in FIG. 1 and FIG. 2. The liquid crystal display 49 displays thereon various kinds of information. When an obstacle is detected in the captured image captured by the camera unit 40 with the forklift truck 10 moving rearward, such obstacle is displayed on a display screen of the liquid crystal display 49. For example, as illustrated in FIG. 3B, types of obstacles (an object G, a human H), positions of the obstacles, and distances to the obstacles with respect to the forklift truck 10 are simply displayed on the display screen. For this purpose, the controller 41 determines the types of the obstacles (the object G, the human H) based on the captured image captured by the camera unit 40, and obtains the positions of the obstacles and the distances to the obstacles.

A left area on the display screen of the liquid crystal display 49 corresponds to a first display part 49A on which the obstacles are displayed. A right area on the display screen of the liquid crystal display 49 corresponds to a second display part 49B on which information other than the obstacles is displayed. A shape S1 indicating the forklift truck 10 is displayed in the first display part 49A. A front direction of the forklift truck 10 corresponds to an upper side of a sheet on which FIG. 3B is drawn, and a rear direction of the forklift truck 10 corresponds to a lower side of the sheet on which FIG. 3B is drawn. The first display part 49A is divided into three areas which are respectively set as shape display areas E1, E2, and E3 indicating a rear direction, a rear left direction, and a rear right direction of the forklift truck 10. The shape display areas E1, E2, and E3 have distance display parts 50, respectively. When an obstacle is detected, the shape display areas E1, E2, and E3 selectively display thereon a shape S2 indicating the object G as the obstacle or a shape S3 indicating the human H as the obstacle. The distance display parts 50 each display thereon a value indicating an approximate distance between the obstacle to be displayed and the vehicle body 11. The unit of the distance is expressed in meters. When an obstacle is not detected, no shape is displayed in the shape display areas E1, E2, and E3 and no value is displayed in the distance display parts 50.

In an example illustrated in FIG. 3B, the shape S2 indicating the object G is displayed in the shape display area E1 corresponding to the rear side of the forklift truck 10. One distance display part 50 below the shape S2 indicates a value indicating that the distance from the vehicle body 11 to the obstacle (the object G) is 2 meters. In addition, the shape S3 indicating the human H is displayed in the shape display area E2 corresponding to the rear left direction of the forklift truck 10. One distance display part 50 below the shape S3 displays a value indicating that the distance from the vehicle body 11 to the obstacle (the human H) is 2 meters. The shapes S2 and S3 indicating the obstacles are not displayed in the shape display area E3 corresponding to a rear right direction of the forklift truck 10. This indicates that the obstacles do not exist in the rear right direction of the forklift truck 10. Therefore, the distance display part 50 of the shape display area E3 does not display any values.

Figure 4A:
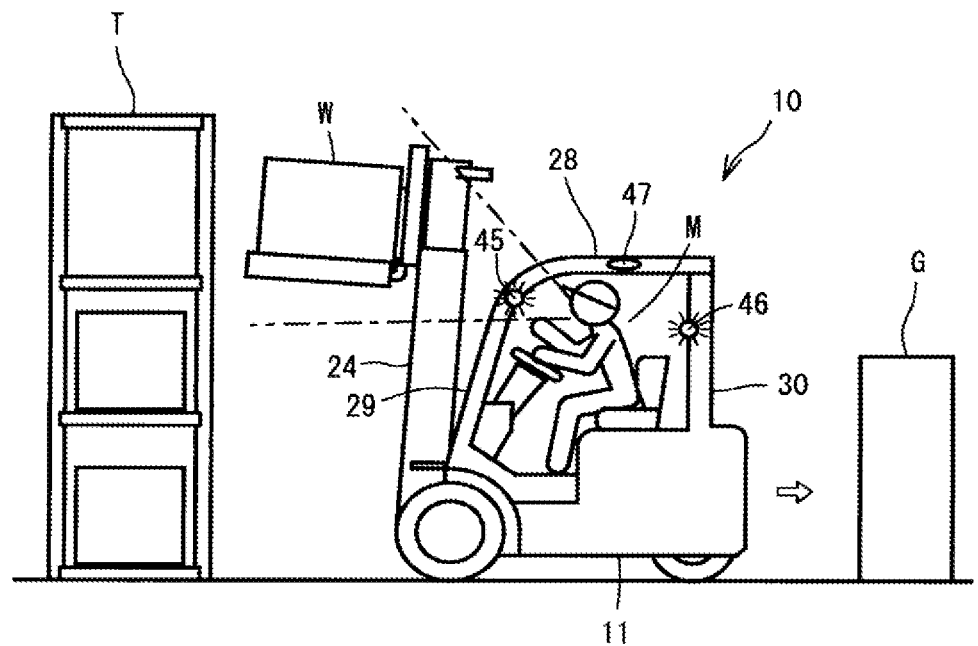
FIG. 4A is a side view of the forklift truck while moving rearward by operation of an operator facing a front direction of the forklift truck.

Next, operations of the industrial vehicle of the present embodiment will be described. The operator sitting on the driver seat 17 drives the forklift truck 10. As illustrated in FIG. 4A, for example, when a cargo handling work is operated with respect to a rack T, an operator M operates the forklift truck 10 to move rearward while paying attention to a cargo W at a high position. At this time, since the forward-reverse switching lever is at the reverse position, the controller 41 determines that the forklift truck 10 moves rearward based on the output signal from the forward-reverse switching lever sensor 48. The camera unit 40 captures the image of the rear direction of the vehicle body 11 when the forklift truck 10 moves rearward.

When the obstacle (the object G) exists behind the forklift truck 10 while moving rearward and when the obstacle is detected in the captured image captured by the camera unit 40, the controller 41 intermittently lights (blinks) the front warning lamps 45 and the rear warning lamps 46, and actuates the warning buzzer 47. In addition, the liquid crystal display 49 displays thereon the obstacle. In the liquid crystal display 49, the type of the obstacle and the distance to the obstacle are simply displayed. Even when the operator M faces the front direction of the forklift truck 10, it is easy for the operator M to immediately recognize the obstacle behind the forklift truck 10 by seeing lighting of the front warning lamps 45 and hearing the warning sound of the warning buzzer 47. In addition, when the operator M sees the liquid crystal display 49 immediately after the front warning lamps 45, the rear warning lamps 46, and the warning buzzer 47 are actuated, the operator M can immediately recognize the type and position of the obstacle, and the distance to the obstacle behind the forklift truck 10.

Figure 4B:
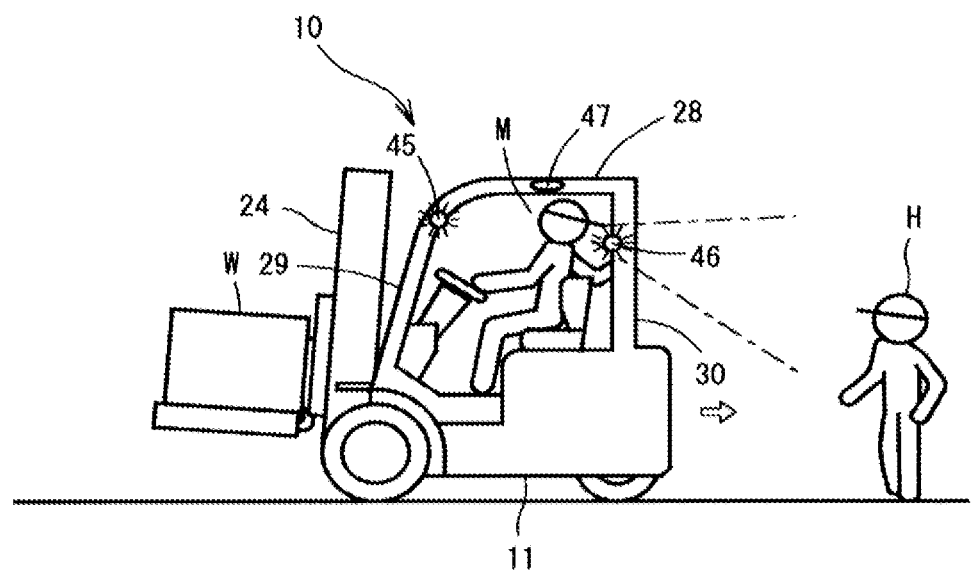
FIG. 4B is a side view of the forklift truck while moving rearward by operation of the operator facing a rear direction of the forklift truck.

As illustrated in FIG. 4B, irrespective of presence or absence of the cargo W on the forks 26, when the operator M operates the forklift truck 10 to move rearward while looking back, the front warning lamps 45, the rear warning lamps 46, and the warning buzzer 47 are actuated upon detection of the obstacle (the human H) behind the forklift truck 10. Since the operator M who is looking back sees lighting of the rear warning lamps 46, it is easy for the operator M to immediately recognize the obstacle behind the forklift truck 10.

The forklift truck 10 of the present embodiment has the following effects.

(1) The warning generator is actuated upon detection of the obstacle behind the forklift truck 10 when the forklift truck 10 moves rearward with the operator on the forklift truck 10 facing the front direction of the forklift truck 10. Actuation of the warning generator allows the operator to recognize the obstacle behind the forklift truck 10. Since the warning generator is positioned at least in front of the driver seat 17 of the driver compartment 13, the operator facing the front direction of the forklift truck 10 can easily recognize a warning indicating presence of the obstacle behind the forklift truck 10. That is, even when the operator facing the front direction of the forklift truck 10 operates the forklift truck 10 to move backward, the obstacle behind the vehicle body 11 can be detected and the operator can be notified of presence of the obstacle behind the vehicle body 11.

(2) The forklift truck 10 has the head guard 28 that protects an upper part of the driver compartment 13 and the front pillars 29 that are attached to the vehicle body 11 and support the head guard 28. The warning generators correspond to the front warning lamps 45 attached to the front pillars 29, respectively. When the camera unit 40 detects the obstacle behind the vehicle body 11 that is moving rearward, the controller 41 lights the front warning lamps 45. The front warning lamps 45 corresponding to the warning generators are positioned within the visible area of the operator facing the front direction of the forklift truck 10. Therefore, the front warning lamps 45 light up upon detection of the obstacle behind the forklift truck 10 when the operator facing the front direction of the forklift truck 10 operates the forklift truck 10 to move rearward. This allows the operator to immediately recognize that the obstacle exists behind the forklift truck 10.

(3) The forklift truck 10 has the rear pillars 30 that are attached to the vehicle body 11 and support the head guard 28, and the rear warning lamps 46 that are respectively attached to the rear pillars 30 and controlled by the controller 41. When the camera unit 40 detects the obstacle behind the vehicle body 11 that is moving rearward, the controller 41 lights the front warning lamps 45 and the rear warning lamps 46. Therefore, even when the operator not only faces the front direction of the forklift truck 10 but also faces the rear direction of the forklift truck 10, lighting of the rear warning lamps 46 allows the operator to immediately recognize presence of the obstacle behind the forklift truck 10.

(4) The front warning lamps 45 are attached to a position higher than the rear warning lamps 46 in the vertical direction. Thus, even when the operator faces the front direction of the forklift truck 10 and looks up at the cargo W placed on the forks 26 lifted upward at a relatively high position, the operator can immediately recognize lighting of the front warning lamps 45.

(5) The vehicle body 11 has the liquid crystal display 49 provided in a front part of the driver compartment 13. When the camera unit 40 detects the obstacle behind the vehicle body 11, the liquid crystal display 49 displays a position of the obstacle detected by the camera unit 40. Therefore, upon actuation of the warning generator, the operator confirms the liquid crystal display 49, thereby recognizing the position of the obstacle.

(6) Since the front warning lamps 45 are attached onto rear surfaces of the front pillars 29 respectively, the operator facing the front direction of the forklift truck 10 easily sees the front warning lamps 45. Since the rear warning lamps 46 are respectively attached onto front surfaces of the rear pillars 30, the operator who is looking back easily sees the rear warning lamps 46. The sounding surface of the warning buzzer 47 faces the driver seat 17, which allows the operator to easily hear the warning sound and prevents rainwater from entering the sound surface of the warning buzzer 47, thereby preventing the warning buzzer 47 from being damaged by the rainwater.

Second Embodiment

Next, a forklift truck according to a second embodiment will be described. In the forklift truck according to the present embodiment, lighting patterns of front warning lamps and rear warning lamps are different from that of the first embodiment. Since a forklift truck according to the second embodiment has the same configuration as the first embodiment, description will be given with the same reference signs.

Figure 5A:
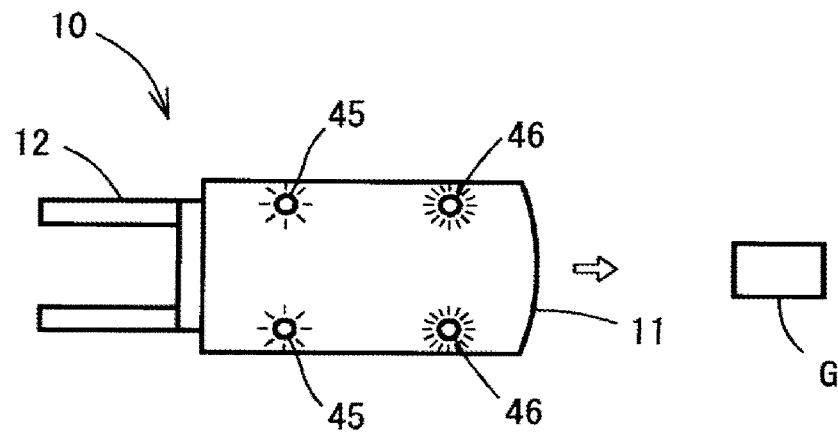
FIG. 5A is an explanatory diagram when an obstacle is detected in a rear direction of a forklift truck according to a second embodiment.
Figure 5B:
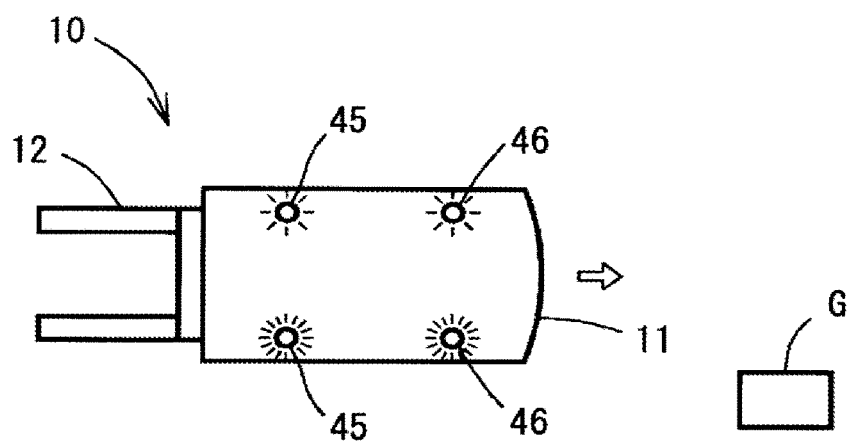
FIG. 5B is an explanatory diagram when an obstacle is detected in a rear left direction of the forklift truck according to the second embodiment.
Figure 5C:
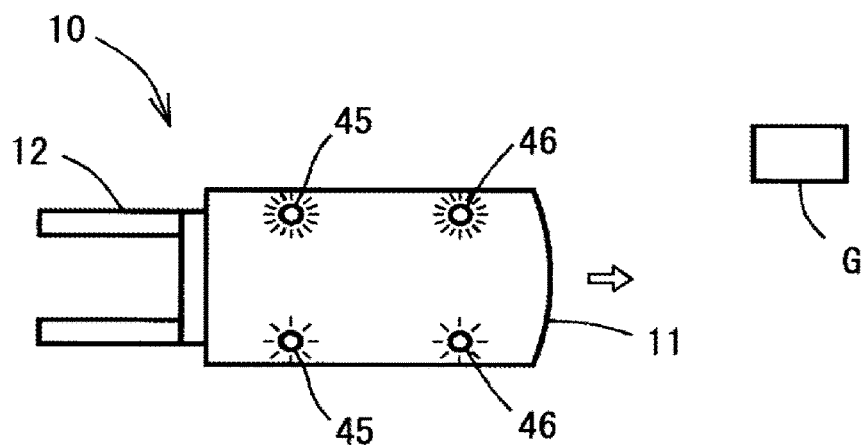
FIG. 5C is an explanatory diagram when an obstacle is detected in a rear right direction of the forklift truck according to the second embodiment.

As illustrated in FIG. 5A to FIG. 5C, in the present embodiment, when an obstacle is detected behind a vehicle body 11, a controller 41 changes a lighting pattern depending on a position of the obstacle. As illustrated in FIG. 5A, when the obstacle is detected in a rear direction of a forklift truck 10, the lighting pattern is set such that a blinking cycle of rear warning lamps 46 is shorter than that of front warning lamps 45.

As illustrated in FIG. 5B, when the obstacle is detected in the rear left direction of the forklift truck 10, the lighting pattern is set such that a blinking cycle of a left front warning lamp 45 and a left rear warning lamp 46 is shorter than that of a right front warning lamp 45 and a right rear warning lamp 46. As illustrated in FIG. 5C, when the obstacle is detected in a rear right direction of the forklift truck 10, the lighting pattern is set such that a blinking cycle of the right front warning lamp 45 and the right rear warning lamp 46 is shorter than that of the left front warning lamp 45 and the left rear warning lamp 46. As such, in the present embodiment, a blinking cycle of the warning lamps close to the obstacle are set shorter than that of the warning lamps other than that close to the obstacle.

In the present embodiment, since the lighting patterns of the front warning lamps 45 and the rear warning lamps 46 are changed depending on the position of the obstacle, the operator confirms the lighting patterns, thereby easily recognizing the position of the obstacle. Since the operator can recognize the position of the obstacle by confirming the lighting patterns, it is not necessary to graphically display the obstacle on the liquid crystal display 49.

The present disclosure is not limited to the above-described embodiments and can be modified within the scope of the present disclosure. For example, the following modified examples are acceptable.

In the above-described embodiments, the warning generators are attached to the front pillars and the rear pillars, but other arrangements are acceptable. The warning generator may be attached to a front part of the head guard, for example. An industrial vehicle may have only the front warning lamps without the rear warning lamps and the warning buzzer. The industrial vehicle may have only warning buzzers serving as the respective warning generators attached to the front pillars and the rear pillars without the warning lamps.

In the above-described embodiments, the warning generators are attached to the front pillars and the rear pillars, but other arrangements are acceptable. When the industrial vehicle is a forklift truck, the warning generators may be positioned in front of the driver compartment, for example, attached to a mast or a lift bracket of a cargo handling system.

In the above-described embodiments, the forklift truck serving as the industrial vehicle is described as an example, but vehicles other than the forklift truck may serve as the industrial vehicle. The industrial vehicle may be construction vehicles such as a wheel loader. When the industrial vehicle corresponds to the forklift truck, the forklift truck is not limited to a counterweight-type forklift truck described herein but may be a reach-type forklift truck.

In the above-described embodiments, the camera unit having the stereo camera corresponding to the obstacle detector is exemplified, but the obstacle detector is not limited to the stereo camera. The obstacle detector may be a rangefinder (for example, 3D-LiDAR) having a lens in addition to the camera, an optical sensor having a light emitting part having the lens, or radars using ultrasonic waves.

In the above-described embodiments, the warning lamps intermittently light up (blink), but other lighting patterns are acceptable. For example, the warning lamps may continuously light up, instead of intermittent lighting (blinking). In the second embodiment, the lighting patterns have different blinking cycles of the warning lamps so that the operator can recognize the position of the obstacle, but other lighting patterns are acceptable. For example, when the warning lamps can emit multiple colors, the lighting patterns may be set so as to change emission colors of a warning lamp close to the obstacle.

In the above-described embodiments, a single warning generator is attached to each of the front pillars and the rear pillars, but any number of the warning generators is acceptable. For example, a plurality of warning generators may be attached to the front pillars and the rear pillars. Any number of the warning buzzers provided in the forklift truck is acceptable.

In the above-described embodiments, a liquid crystal display serving as a display device is attached to a front part of the driver compartment, on an instrument panel, but other arrangements are acceptable. For example, the display device may be attached to the front pillars, or the display device may be hung from the head guard.

In the above-described embodiments, the controller 41 determines that the forklift truck 10 moves rearward based on the output signal from the forward-reverse switching lever sensor 48, but a moving direction of the forklift truck 10 may be detected by using other means. For example, obstacle position information that is always calculated from a parallax image obtained by the stereo camera of the camera unit 40 may show that the obstacle approaches the forklift truck 10; therefore, in this case, it may be determined that the forklift truck 10 moves rearward. Accordingly, the obstacle detector detects the obstacle behind the forklift truck 10 when the vehicle body 11 moves rearward.

What is claimed is:

1. An industrial vehicle comprising:
    a vehicle body;
    a driver compartment provided in the vehicle body;
    a sensor configured to detect a moving direction of the vehicle body based on a position of a direction switch in the driver compartment;
    an obstacle detector configured to detect an obstacle existing behind the vehicle body;
    a warning generator configured to generate a warning;
    a control device configured to control the warning generator, wherein
    the warning generator comprises warning lamps, positioned in the driver compartment, in front and rear of an operator,
    the control device actuates the warning generator based on the sensor detecting that the vehicle body is moving rearward and the obstacle detector detecting an obstacle behind the vehicle body that is moving rearward; and
    a warning buzzer attached to a backside surface of a roof of the head guard such that a sounding surface of the warning buzzer is oriented downward toward a driver seat of the vehicle compartment,
    wherein a blinking cycle of a first pair of the warning lamps corresponding to a side of the vehicle body that the obstacle is detected is set shorter than the blinking cycle of another pair of the warning lamps on an opposite side of the vehicle body.

2. The industrial vehicle according to claim 1, further comprising:
    a head guard that protects an upper part of the driver compartment; and
    a front pillar that is attached to the vehicle body and supports the head guard, wherein
    the warning lamps comprise front warning lamps attached to at least one of the front pillar and a front part of the head guard, and
    the control device lights the front warning lamps when the obstacle detector detects an obstacle behind the vehicle body that is moving rearward.

3. The industrial vehicle according to claim 2, further comprising:

a rear pillar that is attached to the vehicle body and supports the head guard, wherein the warning lamps comprise rear warning lamps attached to the rear pillar and controlled by the control device, wherein the control device lights the rear warning lamps when the obstacle detector detects an obstacle behind the vehicle body that is moving rearward.

4. The industrial vehicle according to claim 3, wherein the front warning lamps are positioned higher than the rear warning lamps in a vertical direction.

5. The industrial vehicle according to claim 2, wherein a width of the warning generator is smaller than a width of the front pillar and a height of the warning generator is smaller than a height of the front pillar when viewed from the driver compartment.

6. The industrial vehicle according to claim 1, wherein the vehicle body has a display device at a front part of the driver compartment, and when the obstacle detector detects an obstacle behind the vehicle body that is moving rearward, the display device displays thereon a position of the obstacle detected by the obstacle detector.

7. The industrial vehicle according to claim 1, wherein the warning generator is positioned above and attached to a side mirror of the vehicle body.

8. An industrial vehicle comprising:

a vehicle body;

a driver compartment provided in the vehicle body;

a head guard that protects an upper part of the drive compartment;

a front pillar that is attached to the vehicle body and supports the head guard;

an obstacle detector configured to detect an obstacle existing behind the vehicle body;

a warning generator configured to generate a warning;

a control device configured to control the warning generator, wherein the control device actuates the warning generator when the obstacle detector detects an obstacle behind the vehicle body that is moving rearward, the warning generator comprises warning lamps positioned above a side mirror attached to the front pillar of the vehicle body on a rear part of the front pillar so as to face a driver seat in the driver compartment and positioned on a rear pillar of the vehicle body in rear of the driver seat; and a warning buzzer attached to a backside surface of a roof of the head guard such that a sounding surface of the warning buzzer is oriented downward toward the driver seat, wherein a blinking cycle of a first pair of the warning lamps corresponding to a side of the vehicle body that the obstacle is detected is set shorter than the blinking cycle of another pair of the warning lamps on an opposite side of the vehicle body.

9. The industrial vehicle according to claim 8, wherein a width of the warning generator is smaller than a width of the front pillar and a height of the warning generator is smaller than a height of the front pillar when viewed from the driver compartment.

* * * * *